(12) United States Patent
Frink et al.

(10) Patent No.: US 10,486,840 B2
(45) Date of Patent: Nov. 26, 2019

(54) POWERED BANDING DEVICE AND RELATED METHODS

(71) Applicant: DANIELS MANUFACTURING CORPORATION, Orlando, FL (US)

(72) Inventors: Matthew Steven Frink, Orlando, FL (US); Aron Bacs, Jr., Orlando, FL (US)

(73) Assignee: DANIELS MANUFACTURING CORPORATION, Orlando, FL (US)

( * ) Notice: Subject to any disclaimer, the term of this patent is extended or adjusted under 35 U.S.C. 154(b) by 28 days.

(21) Appl. No.: 15/612,188

(22) Filed: Jun. 2, 2017

(65) Prior Publication Data

US 2018/0346161 A1   Dec. 6, 2018

(51) Int. Cl.
| | | |
|---|---|---|
| *B65B 13/34* | (2006.01) | |
| *F16L 33/02* | (2006.01) | |
| *B23P 19/08* | (2006.01) | |
| *B65B 25/00* | (2006.01) | |
| *B65B 13/02* | (2006.01) | |

(52) U.S. Cl.
CPC ................... *B65B 13/34* (2013.01)

(58) Field of Classification Search
CPC ....... B65B 13/02; B65B 13/027; B65B 13/22; B65B 13/32; B65B 13/34; B65B 13/005; B65B 13/023; B65B 13/086; B25B 25/00; B25B 25/005; H02G 1/00; F16L 33/023
USPC .......................... 100/29, 32; 140/93.4, 123.6
See application file for complete search history.

(56) References Cited

U.S. PATENT DOCUMENTS

| | | |
|---|---|---|
| 4,688,607 A | 8/1987 | Wolcott |
| 4,696,327 A | 9/1987 | Wolcott |
| 4,934,416 A | 6/1990 | Tonkiss |
| 6,481,467 B2 | 11/2002 | Czebatul et al. |
| 6,601,616 B1 | 8/2003 | Lenox |
| 8,051,881 B2 | 11/2011 | Segroves |

(Continued)

FOREIGN PATENT DOCUMENTS

EP          0371290          6/1990

OTHER PUBLICATIONS

IDEX Corporation, Band-It the Clamping Experts, brochure, accessed on Mar. 15, 2017, B-80EE 9/06, 32 pp., https://www.reynoldsonline.com/ASSETS/DOCUMENTS/ITEMS/EN/CONCC075_Spec.pdf.

(Continued)

*Primary Examiner* — Adam J Eiseman
*Assistant Examiner* — Mohammed S. Alawadi
(74) *Attorney, Agent, or Firm* — Matthew G. McKinney, Esq.; Allen, Dyer et al.

(57) ABSTRACT

A powered banding device includes a housing and a plurality of gripping rollers within the housing that are configured to pull a tail end of a band through a feed slot as the gripping rollers rotate. The device also includes torque circuitry coupled to an electric motor driving the plurality of gripping rollers, which the torque circuitry is configured to calculate a torque on the band using a motor current to determine when to stop pulling. A roller pin is configured to move through a roller slot after the electric motor stops pulling to form a fold in the band as the roller pin moves to an end of a downward curved portion of the roller slot. A cutter blade behind the roller pin follows the roller pin and cuts the band above the roller pin and flattens a cut end over a buckle of the band.

19 Claims, 12 Drawing Sheets

(56) References Cited

U.S. PATENT DOCUMENTS

| | | | |
|---|---|---|---|
| 8,356,641 B2* | 1/2013 | Marelin | B65B 13/02 |
| | | | 140/152 |
| 2002/0129866 A1* | 9/2002 | Czebatul | B23P 19/084 |
| | | | 140/123.6 |
| 2009/0114308 A1 | 5/2009 | Marelin et al. | |
| 2009/0242069 A1* | 10/2009 | Segroves | B65B 13/22 |
| | | | 140/123.6 |
| 2016/0016682 A1 | 1/2016 | Boss et al. | |

OTHER PUBLICATIONS

Glenair, Banding System Shield Termination Tools—BAND-IT Tools and Tool Kits for reliable Shield Termination, brochure, 2005, pp. 44-48, www.glenair.com.

Hayata, BTX7000 Battery Powered Banding Tool, 2015, brochure, http://www.hayata.com/wp-content/uploads/pdf/BTX7000%20Flyer.pdf.

ITW Strapbinder, GripClamp Clamp Application Battery Tool, brochure, 2 pages, 2016, www.itwstrapbinder.com.

Electro Adapter, Inc., Calibrated Banding System Operating Procedure OP EAT-214, Manual Hand Tools, Model EAT 214-38, Model EAT 214-25, 8 pp., accessed on Mar. 15, 2017, http://www.electro-adapter.com/Documents/web%20OPEAT-214%20Binder1.pdf.

* cited by examiner

POWERED BANDING DEVICE AND RELATED METHODS

TECHNICAL FIELD

The present invention relates to the field of banding devices, and, more particularly, to a powered banding device and related methods.

BACKGROUND

Band clamps are typically used for clamping hoses, pipes, poles, and EMO shielding on cables or connectors, for example. Common types of band clamps have a free end that is initially wrapped about the object being clamped and passed through a buckle. The buckle is used to lock the band clamp after it has been tightened about the object.

Various tools have been developed to help facilitate the tightening and tensioning of the band clamp. Some of these types of tools may also include a cutting implement to cut the tail end of the band and to lock the band to the buckle to prevent release of the band clamp. The tools may be manually operated by hand, or can be pneumatic or electrical. Some pneumatic or electrical tools are not fully automatic. Instead, the pneumatic or electrical tool performs some of the functions and the user is required to perform the remaining functions to secure the band clamp about an object. For example, the user is manually required to lock or fold the buckle in place after the electrical or pneumatic tool has tightened the band clamp. Although some improvements to band clamping tools have been developed, there is a need for an improved tool that is fully automatic. In particular, there is a need for a powered banding device that can automatically perform all the functions required to tighten a band clamp, and lock and fold it in place with precision.

SUMMARY

In view of the foregoing background, it is therefore an object of the present invention to provide a band clamping tool that is automatic and operates with precision. This and other objects, features, and advantages in accordance with the present invention are provided by a powered banding device. The powered banding device includes a housing having a feed slot along a top surface, a plurality of gears, or other power transmission system within the housing configured to drive gripping rollers to pull a tail end of a band through the feed slot as the gears rotate, and an electric motor coupled to and configured to cause rotation of the plurality of gears to pull the band therebetween. In a particular embodiment, the plurality of gears drive diamond knurled gripping rollers that grip the tail end of the band. The powered banding device also includes torque monitoring, sensing, and control circuitry coupled to the electric motor and configured to calculate a torque and thus the band tension or loop force using a motor current of the electric motor to determine when to stop rotating the plurality of gears driving the gripping rollers and pulling the tail end of the band. In addition, a buckle clamp is configured to slide along the top surface of the housing towards the feed slot to hold a buckle of the band when pulling the tail end of the band through the housing. The buckle clamp comprises a plurality of fingers configured to slidingly engage the buckle of the band.

A roller slot is formed in the housing between the feed slot and first and second gears of the plurality of gears, where the roller slot includes a first horizontal portion and a second downward curved portion. The powered banding device also includes a roller pin within the roller slot, and a cutter blade positioned behind the roller pin within the roller slot. The buckle clamp and the cutting blade are positioned on opposing sides of the buckle in operation.

The roller pin is configured to move through the roller slot once the band has been tightened and the electric motor stops rotating the first and second gears driving the gripping rollers. The cutter blade pushes the roller pin along the horizontal portion of the roller slot and forces it down into the downward curved portion of the roller slot. The roller pin is configured to form a fold in the band as the roller pin moves to an end of the second downward curved portion and to hold the band in tension. As the roller pin enters the downward curved portion of the roller slot, the cutter blade is then allowed to pass over the top of the roller pin to engage and cut the band. In addition, a stationary blade may be fixed across from the first horizontal portion of the roller slot and configured to cooperate with the cutting blade to cut the band using a shearing action as the cutting blade extends across the second downward curved portion of the roller slot. A raised portion on a top surface of the cutter blade is configured to flatten the cut end of the band back over the buckle as the blade continues to move in a forward direction after the band is cut.

An actuator may include a reciprocating piston and be coupled to and configured to sequentially drive the buckle clamp, roller pin and cutter blade back and forth in a reciprocating motion. A controller may be coupled to the actuator and the electric motor, and configured to transmit a signal to engage the actuator when the electric motor has stopped and the band is ready to be cut.

In another particular embodiment, a method for securing a band around an object is disclosed. The method includes feeding a band through a feed slot along a top surface of a housing, sliding a buckle clamp along the top surface of the housing towards the feed slot to hold a buckle of the band, and rotating a plurality of gears within the housing with an electric motor that drives gripping rollers to pull a tail end of the band through the feed slot as the plurality of gears rotate. In addition, the method includes calculating a torque using a motor current of the electric motor to determine when to stop rotating the plurality of gears, moving a roller pin along a roller slot to form a fold in the band, and cutting the band above the fold with a cutting blade. The method also includes transmitting a signal to engage an actuator to initiate movement of the roller pin and the cutting blade to cut the band when the motor has reached the required tension or loop force and stopped, and folding over a cut end of the band. The required tension or loop force of the band is often part of a specific requirement, and this is controlled and monitored with precision.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. For example, the invention may be powered manually, electrically, pneumatically, or hydraulically. Rather, these embodiments are provided so that this disclosure will be thorough and complete, and will fully convey the scope of the invention to those skilled in the art. Like numbers refer to like elements throughout.

With reference to FIGS. 1-6, various views of a powered banding device are shown. The powered banding device is generally designated 100. The powered banding device 100 is configured to tighten a band clamp to a desired tension or loop force. In particular, the powered banding device 100 is used for securing a band clamp about an object, such as a hose. A controller 106 is configured to sequentially control an actuator 102 and an electric motor 104 of the powered banding device 100 in order to properly tighten the band clamp about the object as described below. In addition, the controller 106 may include counter circuitry to store data in order to determine calibrations periods. This data may be accessed using a remote device or may have a visual indicator on the device 100.

When activated, the powered banding device 100 acts to tighten the band clamp by pulling an end of the band through the device 100. The powered banding device 100 also includes a cutting device that is used to cut the tail end from the band clamp after the desired tension is reached and the band clamp is secured to the object. Certain functions associated with the operation of the powered banding device 100 may be manually controlled by the user, or automatically controlled.

A start button 108 is coupled to the controller 106 that is used to initiate a buckle clamp 114 that is configured to slide along a top surface of the housing 112 towards a feed slot 124 to hold a buckle of a band when pulling a tail end of the band through the housing 112. A rocker switch 110 is also coupled to the controller 106 and is used to manually engage the electric motor 104 to tighten or loosen the band around an object by rotating forward/reverse. For example, when the rocker switch 110 is in a "tighten" mode it enables the user to manually control activation of the electric motor 104 in a forward direction to tighten the band 150 under direct user control. When the rocker switch 110 is in a "loosen" mode it enables the user to manually reverse the motor direction when desired. In addition, an emergency stop button 109 is coupled to the controller and is used to disconnect power to the electric motor 104 and actuator 102.

The powered banding device 100 may include an adjustable joint 116 that allows the housing 112 to be rotated and positioned in a desired orientation. A knob 122 is used to loosen and tighten the adjustable joint 116 as needed. The adjustable joint 116 may be supported by a mount 118 that can be fixed to a base 120 or other object such as a bench.

Figure 1:
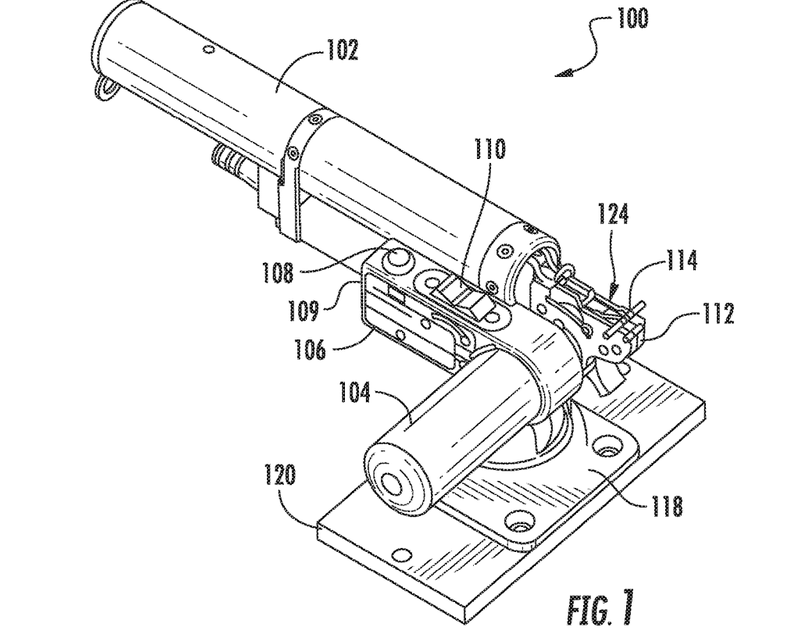
FIG. 1 is a left side top perspective view of a powered banding device in accordance with a particular embodiment of the invention.
Figure 2:
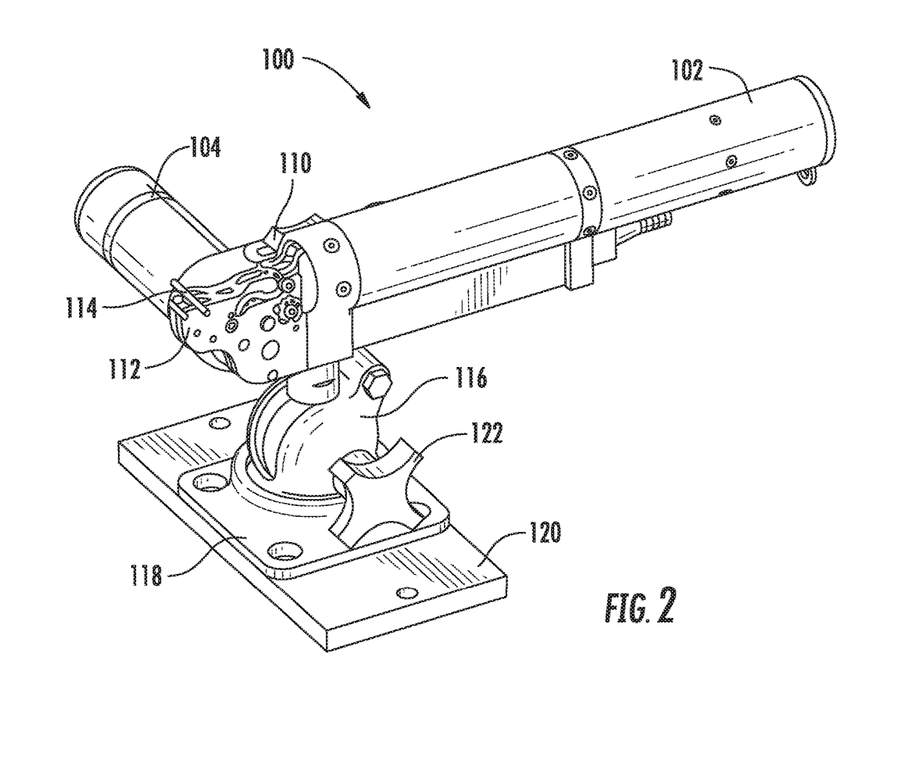
FIG. 2 is a right side top perspective view of the powered banding device.
Figure 3:
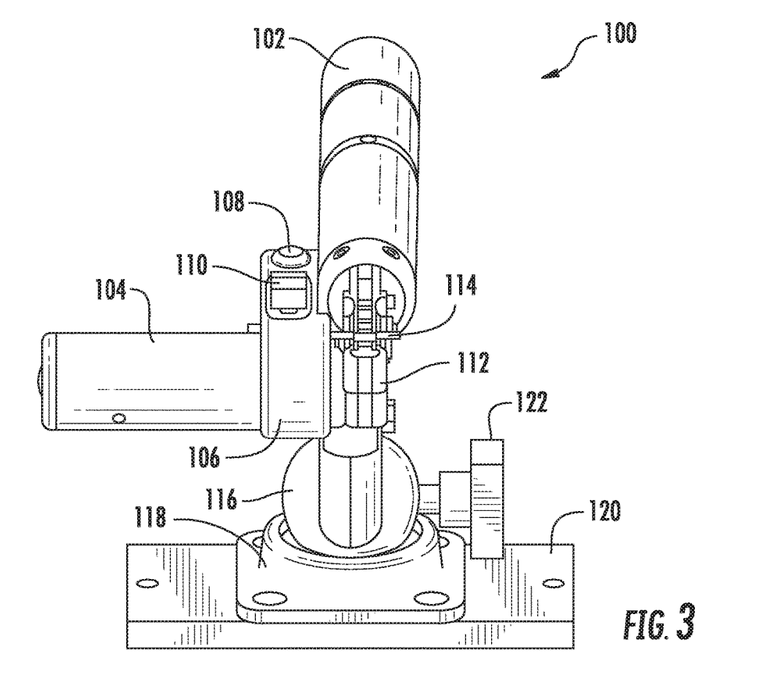
FIG. 3 is a front view of the powered banding device.
Figure 4:
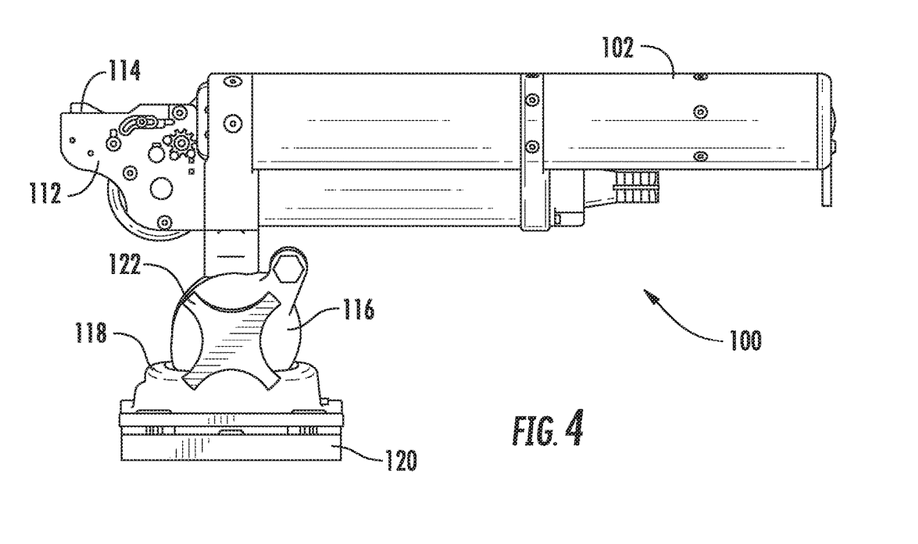
FIG. 4 is a right side elevational view of the powered banding device.
Figure 5:
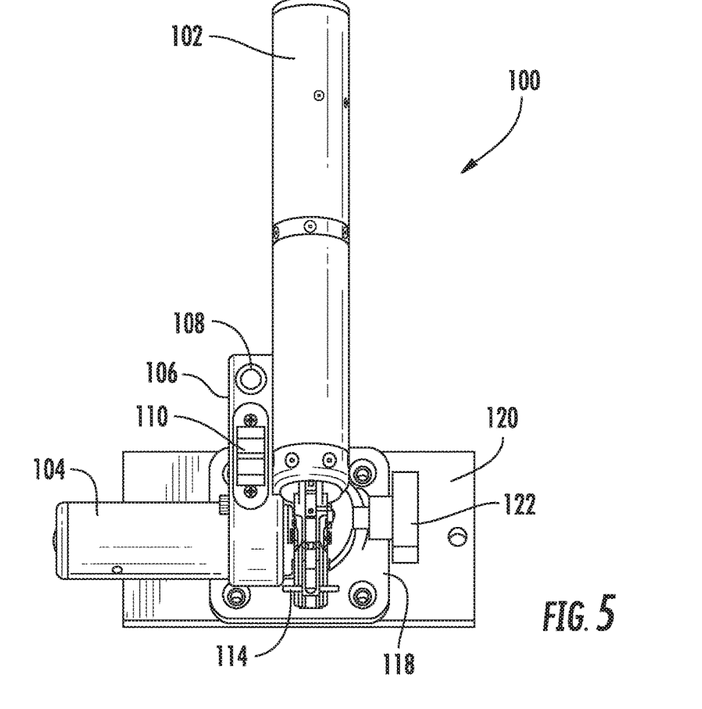
FIG. 5 is a top view of the powered banding device.
Figure 6:
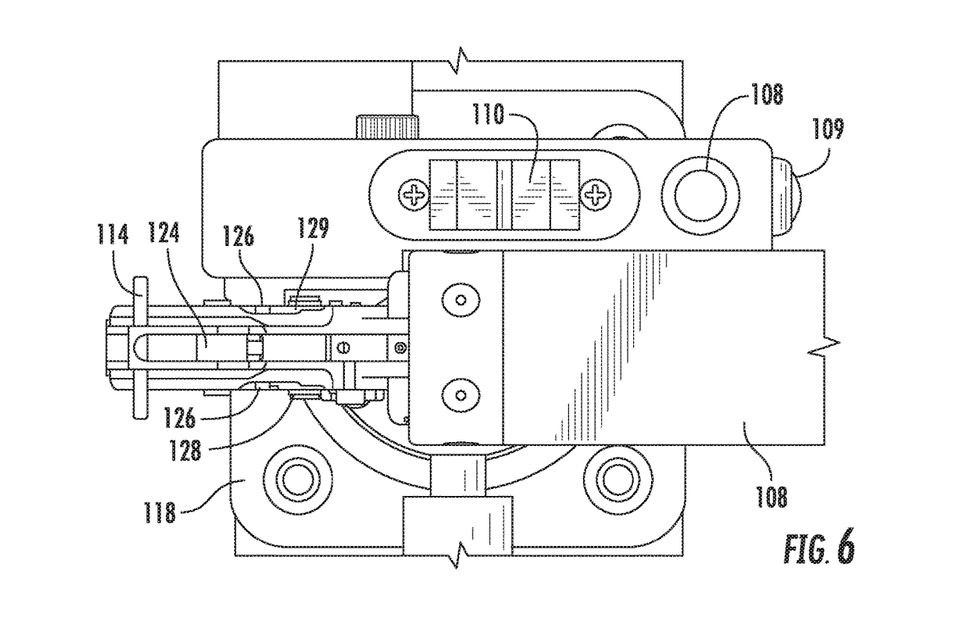
FIG. 6 is a partial top view of the powered banding device.
Figure 7:
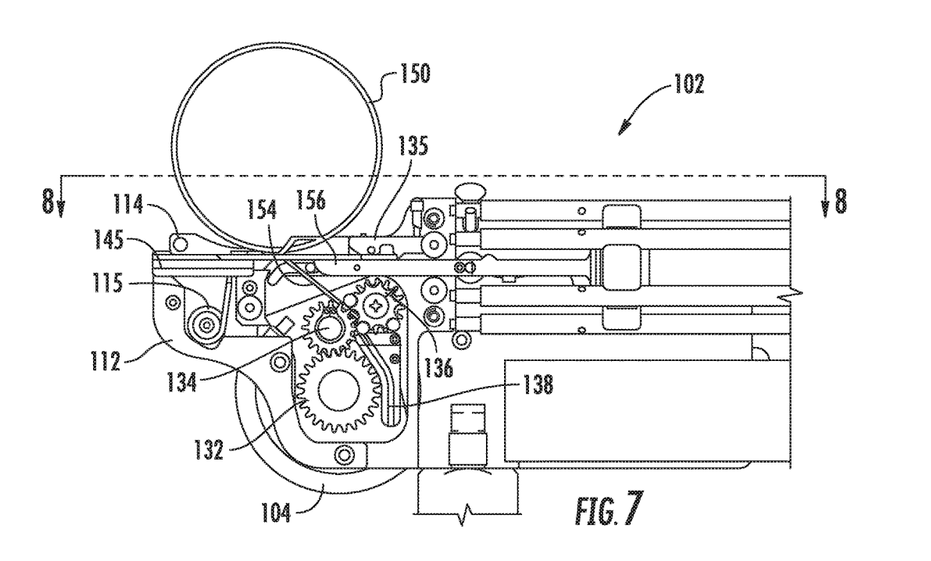
FIG. 7 is a partial right side view of the powered banding device with a cover removed.

Referring now to FIG. 7, it should be understood that the powered banding device 100 could have more or fewer components than those that are illustrated in order to achieve the main objectives of the present invention. Consequently, not all components illustrated in the drawings are critical or necessary to achieve the basic electrical band tightening control sought by the present invention.

Once the band 150 is placed on the device 100, the buckle 152 is ready to be clamped so that the band 150 can be tightened around the desired object. The tail end 154 of the band 150 is manually fed through the feed slot 124 and to first and second gears 134, 136.

In particular, a buckle clamp 114 is slidingly engaged to a top surface of the powered banding device 100. The buckle clamp 114 is configured to move rearward to clamp the buckle 152 of a band, and to move forward to release the buckle. A latch 135 is configured to hold the buckle clamp 114 in position as the band 150 is being tightened, cut, and folded over. A cutter blade 156 is coupled to the actuator 102 that is used to drive the cutter blade 156 forward and rearward, which in turn is used to move the buckle clamp 114 as described in more detail below. In addition, positioned beneath the buckle 152 is buckle support shuttle 145 that is used to act against the downward pulling force on the buckle 152, while pulling the tail end 154 of the band 150 as the band 150 is being tightened. A torsion spring 115 is coupled to the buckle support shuttle 145 within an aperture 172 formed therein and is configured to bias the buckle support shuttle 145 under the buckle 152.

Figure 8:
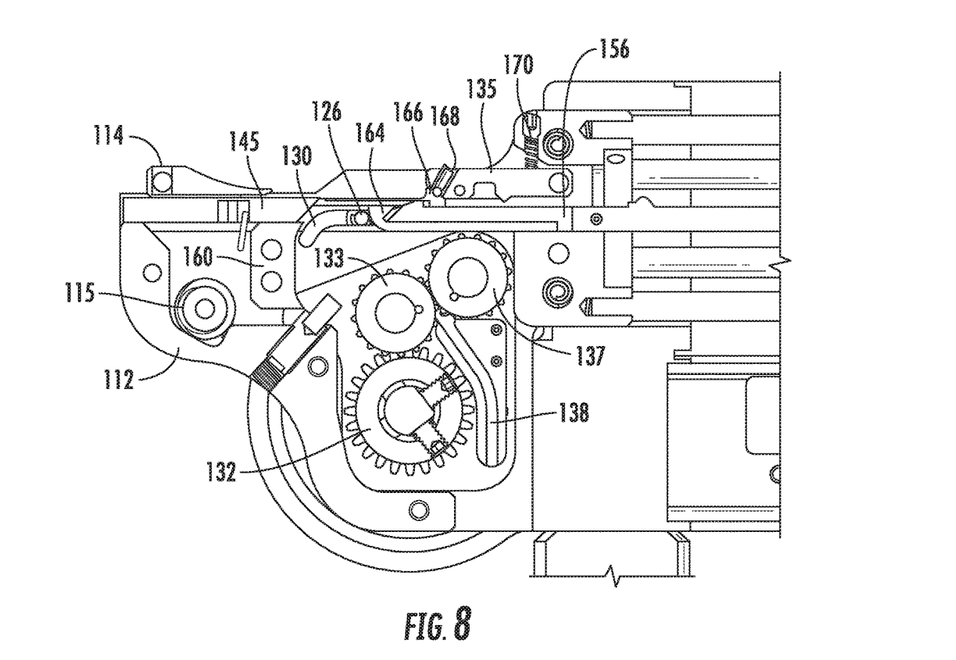
FIG. 8 is a partial cross sectional view of the powered banding device taken in the direction of line 8-8 of FIG. 7.

Referring now to FIG. 8, a partial cross sectional view taken is shown without the band 150 for clarity. In addition, first and second gears 134 and 136 are not shown so that the gripping rollers 133, 137 that are driven by the first and second gears 134, 136 are visible. The location of the buckle support shuttle 145 is positioned under the buckle 152. A lower cutting blade 160 is positioned below the buckle support shuttle 145, and is stationary to provide a shearing cutting action as the cutter blade 156 moves forward to cut the tail end 154 of the band 150. A roller slot 130 is adjacent to the lower cutting blade 160, and the roller slot 130 has a horizontal portion and a curved downward portion. A roller pin 126 is configured to ride in the roller slot and to create a fold in the tail end 154. A first spring 128 and a second spring 129 are used to retract the rolling pin 126 after the band 150 has been cut as described below.

The cutter blade 156 is positioned behind the roller pin 126 within the horizontal portion of the roller slot 130 and is configured to push the roller pin 126 forward along the roller slot 130 and down the curved downward portion. The cutter blade 156 also includes a raised portion 164 that has a rear surface configured to engage a catch 166 on a lower surface of the buckle clamp 114 when moving rearward. The catch 166 includes a detent on an upper surface that is configured to cooperate with a ball spring 168 of latch 135 when the buckle clamp 114 is in its initial position as shown in FIG. 8 and before the buckle 152 is clamped. A spring 170 applies downward force on the latch 135 as the latch 135 is raised by the buckle clamp 114 or the cutter blade 156.

Figure 9:
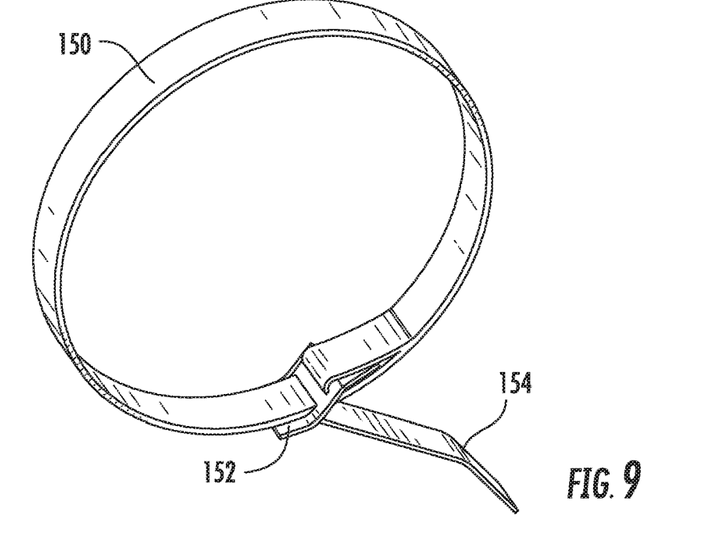
FIG. 9 is a perspective view of a band intended for use with the powered banding device.
Figure 10:
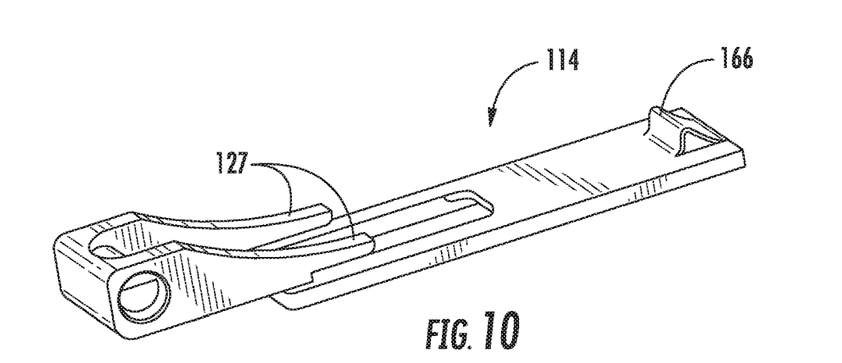
FIG. 10. is a perspective view of a buckle clamp of the powered banding device.
Figure 11:
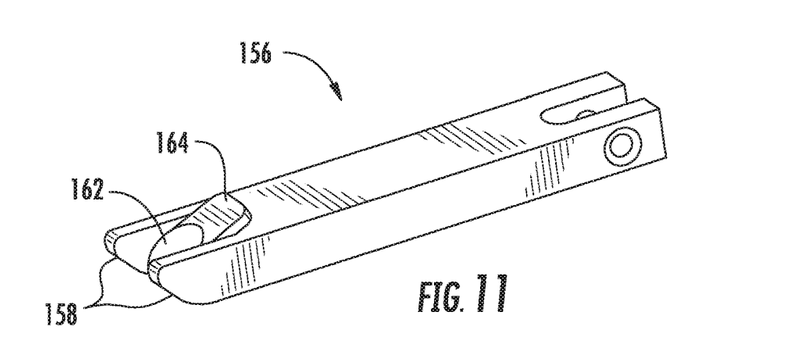
FIG. 11 is a perspective view of a cutter blade of the powered banding device.

Referring now to FIG. 9, a band 150 is shown for use with the powered banding device 100. The tail end 154 passes through the buckle 152, and the open area of the band 150 generally forms a circle shape for clamping around the desired object. The buckle clamp 114 is shown in FIG. 10, where the buckle clamp 114 includes fingers 127 that are configured to slide onto the buckle 152. The catch 166 is formed on an opposing end from the fingers 127. The cutter blade 156 is shown in FIG. 11. The cutter blade 156 includes the raised portion 164 that is configured to engage the catch 166 formed in the lower surface of the buckle clamp 114. On each side of a cutting edge 162 of the cutter blade 156 are extensions 158 that are configured to push the roller pin 126 along the roller slot 130.

Figure 12:
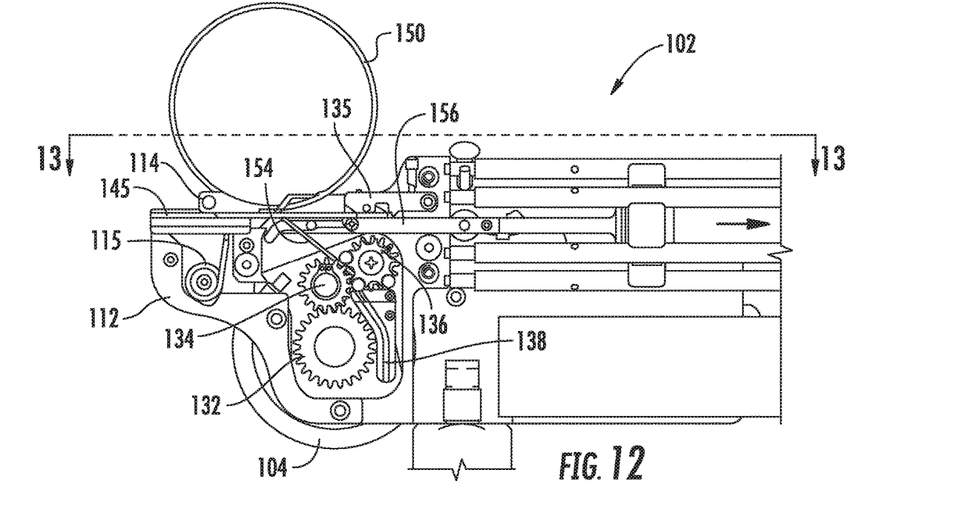
FIG. 12 is a partial right side view of the powered banding device in a start position and illustrating a band being fed into the device.
Figure 13:
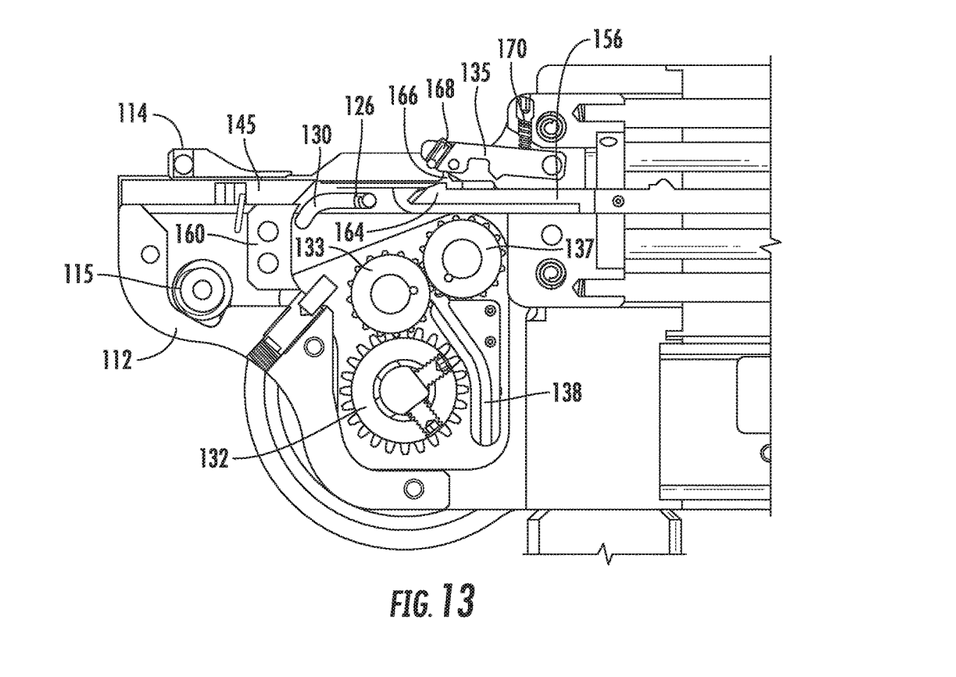
FIG. 13 is a partial cross sectional view of the powered banding device taken in the direction of line 13-13 of FIG. 12 as the buckle clamp is moving towards the buckle.
Figure 14:
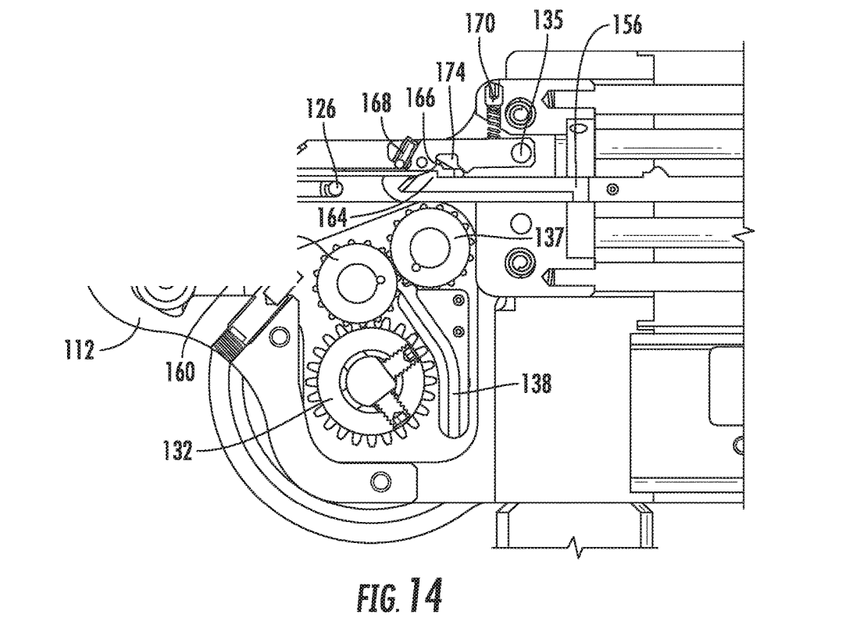
FIG. 14 is a partial cross sectional view with the buckle clamp moved from a position shown in FIG. 13 to a final position.

In order to clamp the buckle 152 into place, the buckle clamp 114 is pulled into close contact with the buckle 152 by a rearward movement of the cutter blade 156 as illustrated in FIGS. 12-14. For example, FIG. 13 shows that as the cutter blade 156 moves rearward, that the raised portion 164 of the cutter blade 156 pulls the buckle clamp 114 rearward as well. In addition, the latch 135 begins to raise up as the spring ball 168 is released from the detent formed in the upper surface of the catch 166. The controller 106 continues to cause the actuator 102 to move the cutter blade 156 rearward until the catch 166 is seated in slot 174 formed in a lower surface of the latch 135. Once the catch 166 is seated in slot 174, the buckle 152 is firmly secured by the buckle clamp 114 and the band 150 is ready to be tightened.

The input voltage for the electric motor 104 and the actuator 102 may be from a standard low voltage source such as 24 VDC. The electric motor 104 may be a brushed or brushless DC motor. The output of the electric motor 104 is connected to a driving gear 132. With respect to controlling operation of the electric motor 104, the controller 106 may have current monitoring or torque sensing circuitry that is configured to calculate a torque using a motor current of the electric motor 104 to determine when to stop rotating the driving gear 132 that drives the first and second gears 134, 136. For example, the torque generated by the electric motor 104 is proportional to the amount of current flowing through the electric motor, where kt=torque constant, I=current, and τ=torque $$\tau(\text{in·lbf}) = kt(\text{in·lb/A}) \times I(A), \text{ and}$$

$$\tau(\text{in·lbf}) = \text{force (lbf)} \times \text{distance (in)}$$

The controller 106 can also be programmed to store a desired tension value (e.g., 150 lbf) that is input by the user. The desired tension value is a result of the torque applied to the band clamp 150, and the electric motor 104 stops when the torque circuitry determines that the desired tension value has been obtained. When the electric motor 104 stops, the tensioning of the band clamp 150 stops.

As previously noted, the rotational movement of the driving gear 132 is applied by means of the electric motor 104. The driving gear 132 has an outer surface or circumferential periphery that meshes with a circumferential periphery of a first gear 134. The circumferential periphery of the first gear 134 meshes with a circumferential periphery of a second gear 136. As the driving gear 132 rotates, it drives the first gear 134 which in turn drives the second gear 136 and the pair of gears 134, 136 cooperate drive the gripping rollers 133, 137 to grip the band therebetween and pull. Accordingly, when the driving gear 132 rotates, such as during tensioning of the band clamp 150, the pair of gears 134, 136 and gripping rollers 133, 137 move therewith and pull the tail end 154 through ejection slot 138 formed in the housing 112.

Figure 15:
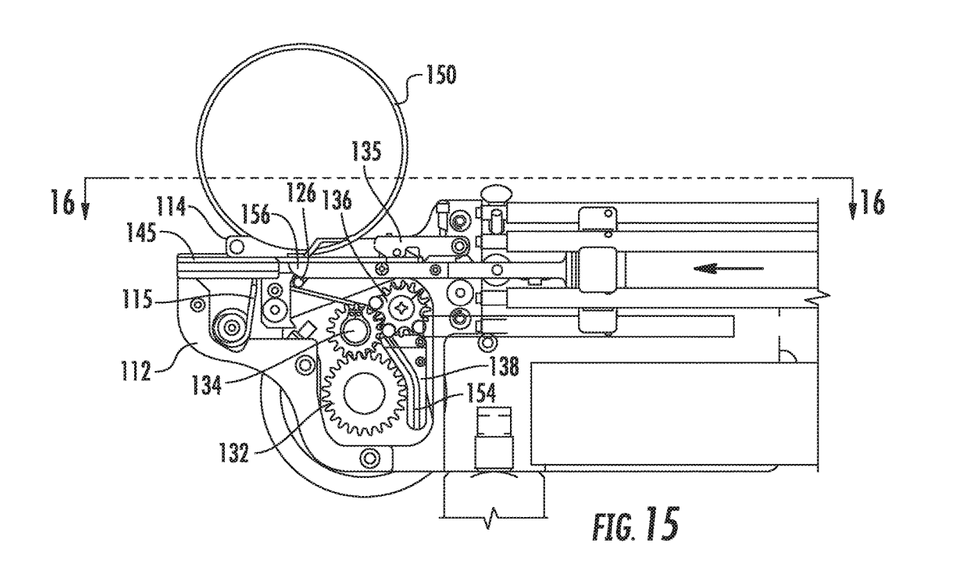
FIG. 15 is a partial right side view of the powered banding device folding the band in preparation to cut the band.

Subsequent to the band 150 reaching the desired tension, a roller pin 126 is pushed forward along the roller slot 130 by the cutter blade 156 in response to a signal from the controller 106 as shown in FIG. 15. In that regard, the actuator 102 includes an actuator drive or motor and is configured to move in a reciprocating motion. The roller slot 130 is formed in the housing 112 between the feed slot 124 and the pair of gears 134, 136.

The roller slot 130 includes the horizontal portion and a contiguous second downward portion. As a driving rod 180 of the actuator 102 moves in a forward motion, the roller pin 126 is pushed forward in the roller slot 130 by the cutter blade 156 towards the second downward portion. The roller pin 126 engages the tail end 154 and forms a fold as illustrated in FIG. 15. The cutter blade 156 does not follow the roller pin 126 into the second downward portion of the roller slot 130. Instead, the cutter blade 156 extends across the second downward portion to cut the tail end 154 above the roller pin 126 and at the location of the fold in the tail end 154 as shown with reference to FIG. 15.

Figure 16:
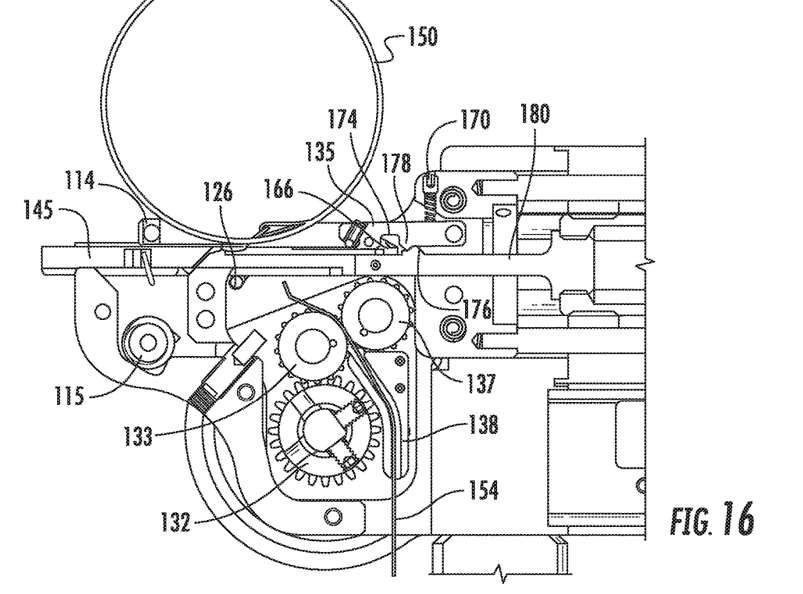
FIG. 16 is a partial cross sectional view of the powered banding device taken in the direction of line 16-16 of FIG. 15 as a cutter blade is moving forward.
Figure 17:
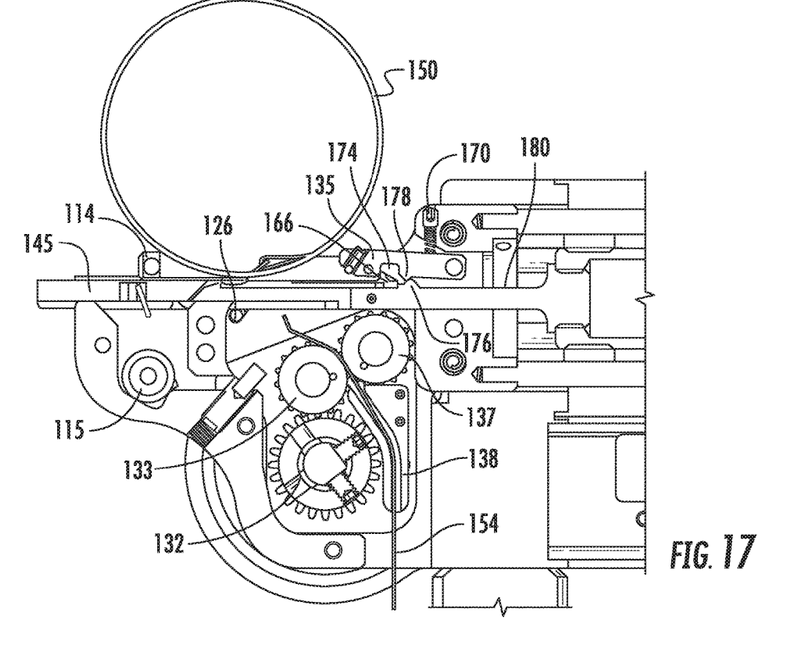
FIG. 17 is a partial cross sectional view of the powered banding device as the cutter blade continues to move forward and begins to raise a latch of the buckle clamp.
Figure 18:
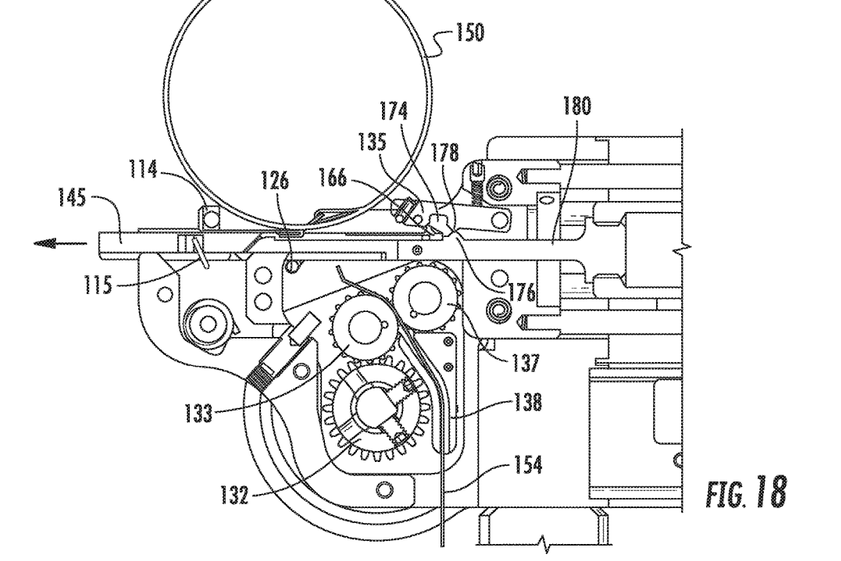
FIG. 18 is a partial cross sectional view of the powered banding device as the cutter blade continues to move forward from its position shown in FIG. 17.
Figure 19:
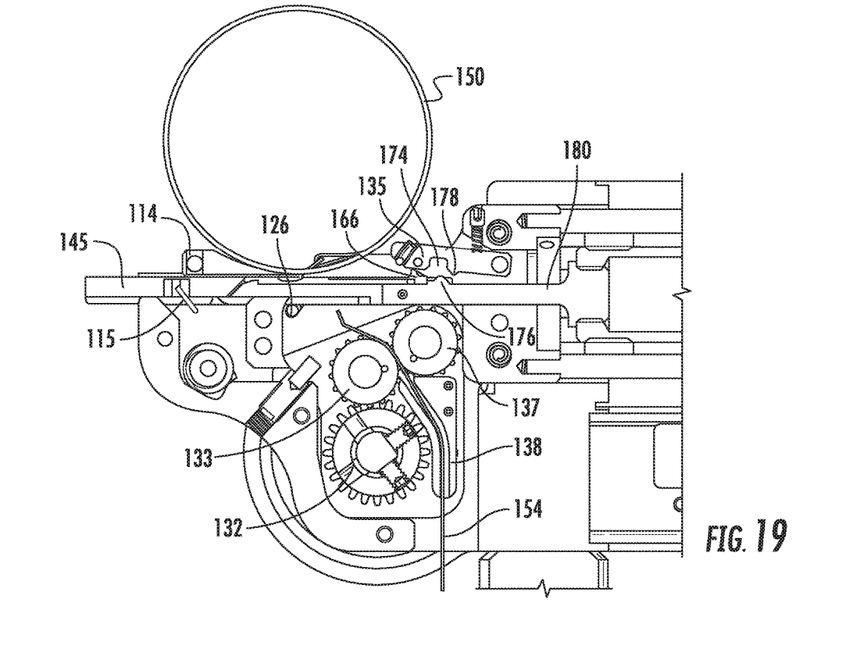
FIG. 19 is a partial cross sectional view of the powered banding device with the latch of the buckle clamp released.

The cutter blade 156 continues to move forward after the tail end 154 has been cut so that the raised portion 164 on a top surface of the cutter blade 156 can flatten the cut end of the band 150 back over the buckle 152 as the blade cutter 156 moves forward. In addition, the cutter blade 156 continues to move in a forward direction after the band is cut so that the buckle clamp 114 can release the buckle 152. In order to release the buckle 152, the latch 135 holding the buckle clamp 114 has to be raised. This is accomplished using an upper protrusion 176 on the driving rod 180 of the actuator 102. As the upper protrusion 176 moves forward, it engages a lower protrusion 178 on a lower surface of the latch 135 as shown in FIG. 16. The actuator 102 continues to move the driving rod 180 forward resulting in the upper protrusion 176 and lower protrusion 178 to cooperate to raise the latch 135 enough to free the catch 166 from slot 174 formed in a lower surface of the latch 135 as shown in FIGS. 17 and 18.

Figure 20:
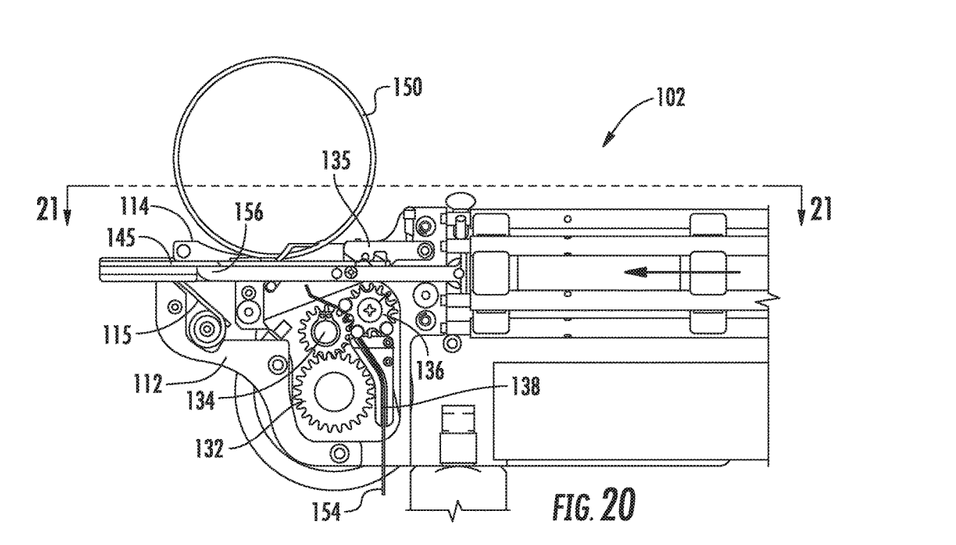
FIG. 20 is a partial right side view of the powered banding device ejecting a tail end of the band from the device and the buckle clamp in the starting position in order to release the buckle.
Figure 21:
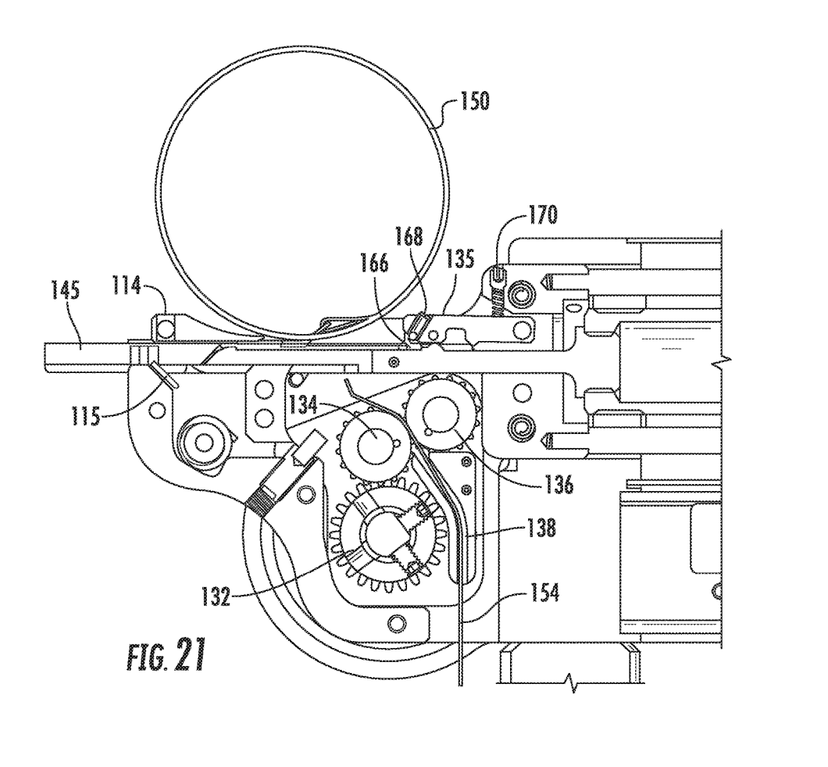
FIG. 21 is a partial cross sectional view of the powered banding device taken in the direction of line 21-21 of FIG. 20.

Once the catch 166 is free, the cutter blade 156 continues to move forward via the actuator 102 until the ball spring 168 is once again seated in the detent of the upper surface of the catch 166 as shown in FIG. 20. FIG. 21 is a partial cross sectional view taken in the direction of line 21-21 of FIG. 20 and shows that the buckle clamp 114 is back to an initial position of FIG. 7.

Figure 23:
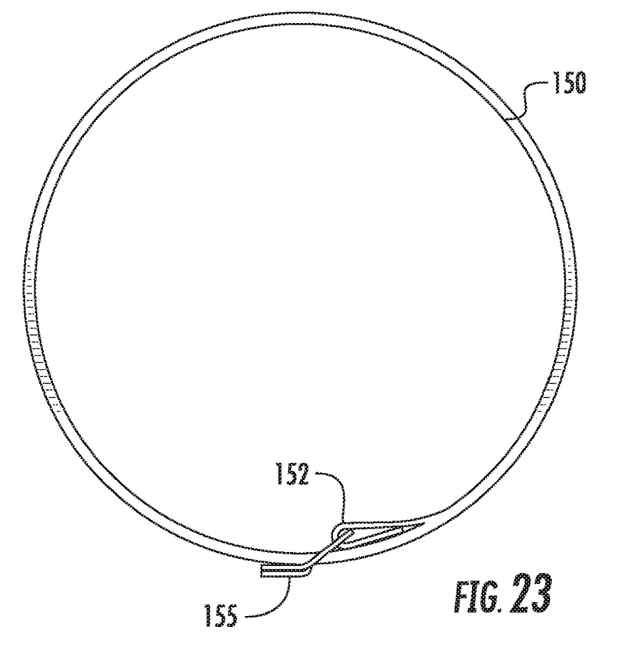
FIG. 23 is an elevational view of the band clamp shown in FIG. 22.
Figure 24:
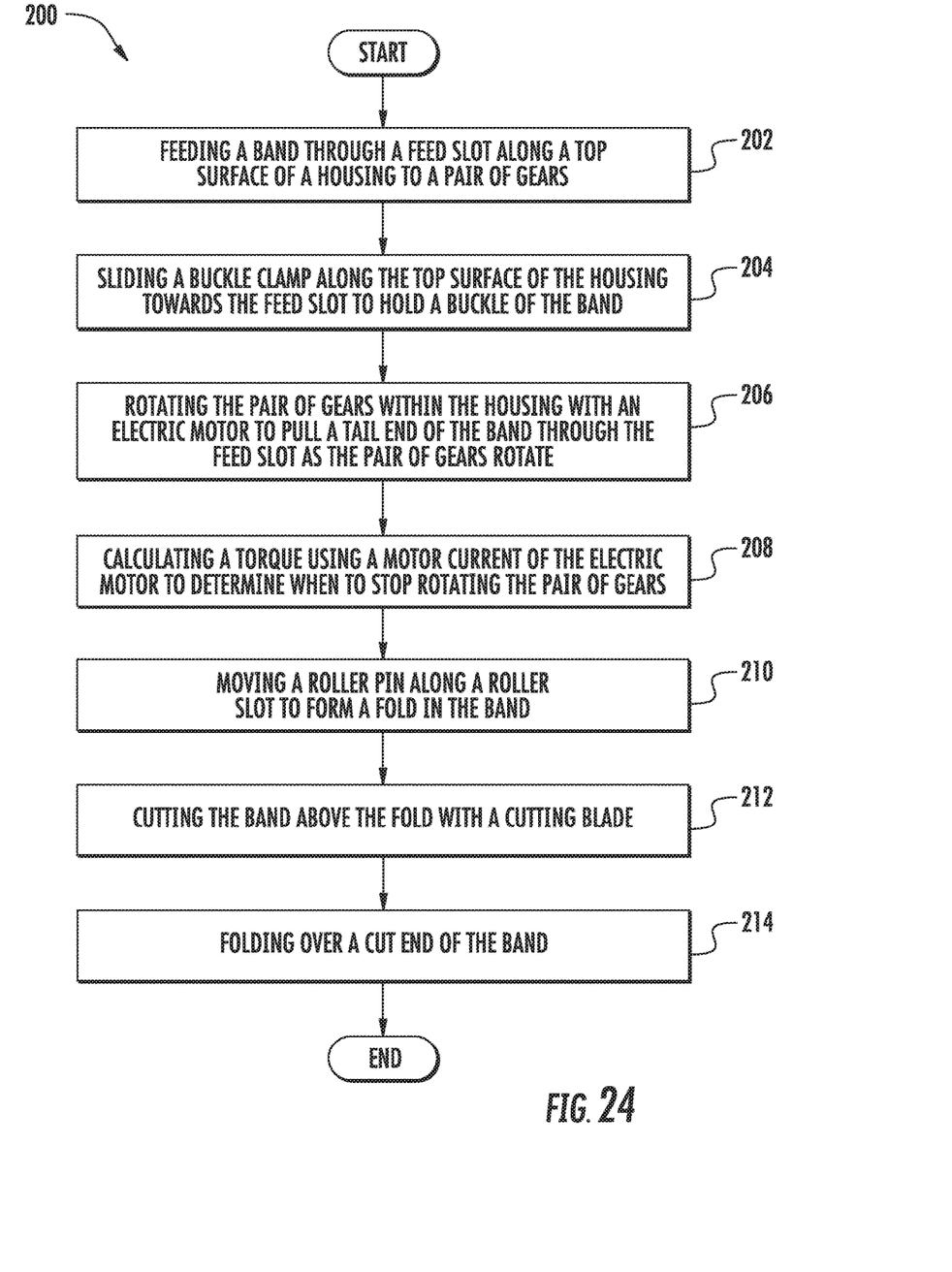
FIG. 24 is a flow diagram of a method of securing a band around an object.

Referring now to FIGS. 23 and 24, the band clamp 150 is shown with a folded cut end 155 flattened over the buckle 152 and locked into place.

The ejection of the tail end 154 from the housing 112 after it has been severed can be controlled using the controller 106. The ejection slot 138 is formed below the first and second gears 134, 136 and has dimensions or a size that allows for the tail end 154 to exit along a lower surface of the housing 112 after it is cut. The first and second gears 134, 136 are activated again to drive the gripping rollers 133, 137 to pull the tail end 154 all the way through the housing 112. In doing so, the tail end 154 is forced out of the housing 112 through the ejection slot 138. Alternatively, the tail end 154 may be held inside the ejection slot 138 until the user manually removes the tail end 154 by pulling it out through the ejection slot 138.

With regard to further descriptions involving the components and operation of the powered banding device 100, the user may set the desired or predetermined tension using the controller 106. In preparing for tightening a particular band clamp 150, the tail end 154 is inserted into the feed slot 124 as shown in FIG. 7. The tail end 154 extends to the intersection between the pair of gears 134, 136. The user, at this point, will press the rocker switch 110 to drive the pair of gears 134, 136 and the gripping rollers 133, 137 and draw the tail end 154 into the housing 112 until the band 150 is positioned properly. When the band 150 is in place, the user will press the start button 108 to activate the actuator 102, which will slide the buckle clamp 114 rearward and lock the buckle 152 to the housing 112, as shown in FIGS. 7 and 8 and as explained above.

With the buckle 152 secured by the buckle clamp 114 at the start of the band tightening or tensioning operation, the pair of gears 134, 136 can be activated by the rocker switch 110. The rocker switch 110 turns the electric motor 104 on and causes the pair of gears 134, 136 to rotate in a first (tighten) direction as shown in FIG. 12. As a shaft of the electric motor 104 continues to rotate and the pair of gears 134, 136 continue to turn, the band 150 is pulled tighter around the object it is being secured to. The buckle clamp 114 ensures that the buckle 152 is strongly held so that the tail end 154 can be pulled on by the gripping rollers 133, 137. The buckle support shuttle 145 acts against the downward pulling force on the buckle 152, while pulling on the tail end 154 of the band 150 as the band 150 is being tightened. From this point on, the buckle clamp 114 is kept in this position as the pair of gears 134, 136 continue to rotate and tighten the band 150.

As the band clamp 150 is being tensioned, the torque circuitry of the controller 106, is monitoring the tension of the band clamp 150. The torque circuitry is configured to calculate the tension by measuring the current of the electric motor 104. The controller 106 may compare the desired tension stored by the controller 106, for example, with the actual tension currently being obtained using the torque circuitry of the controller 106. As the band clamp 150 continues to be tightened as the pair of gears 134, 136 rotate, the tail end 154 continues to be pulled through and pushed out the ejection slot 138.

In a normal operation, eventually the actual tension of the band clamp 150 as measured by the controller 106 becomes substantially equal to the desired tension stored in the controller 106. When this occurs, the electric motor 104 is de-activated. Once the proper tension is achieved and the electric motor 104 is shut off, the actuator 102 is activated whereby the driving rod 180 of the actuator 102 extends causing desired movement and operation of the roller pin 126 and cutter blade 156 as shown in FIGS. 12-21. The actuator 102 may be activated manually by the user starting the cut sequence or this may happen automatically once the calibrated tension has been reached.

After the tail end 154 is cut off, the raised portion 164 on the top surface of the cutter blade 156 flattens the cut end of the band 150 back over the buckle 152 as the cutter blade 156 continues to move in a forward direction. At this point, the buckle clamp 114 is still holding the buckle 152. The actuator 102 continues in the same direction (forward) and engages and pushes the buckle clamp 114 forward, thereby releasing the buckle 152. The user can then remove the terminated assembly (band and hose for example). Once the terminated assembly is removed, the user will press the start button 108 and this will send the driving rod 180 rearward, allowing the roller pin 126 to retract up the curved portion of the roller slot 130 and back to its initial position.

During the tensioning operation, the current associated with the electric motor 104 increases as the pair of gears 134, 136 pull until the desired tension is reached. The controller 106 can be calibrated using an external calibration device to maintain accurate tensioning.

After the desired tension is reached and the tail end 154 is cut off, the electric motor 104 is automatically turned on and runs until the tail end 154 is ejected from the housing 112. The electric motor 104 may run for a pre-set time or until deactivated by the user performing a visual inspection of when the tail end 154 is ejected.

The powered banding device 100 may have the ability to handle many various types of hoses or other objects to be clamped. The types of hoses that might be accounted for include a hard rubber-like hose, a soft rubber-like hose, a solid or metal pipe, or an electrical connector.

Figure 22:
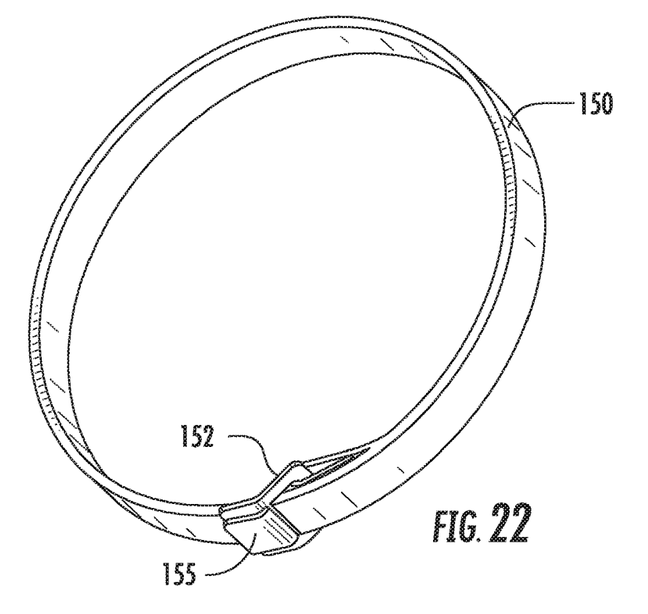
FIG. 22 is a perspective view of a band clamp after being folded and locked using the powered banding device.

With reference to FIG. 22, further information related to the operation of the powered banding device 100 is provided. As depicted in FIG. 22, a method of securing a band around an object is disclosed. The method includes feeding a band through a feed slot along a top surface of a housing to a pair of gears, at 202. Moving to 204, the method includes sliding a buckle clamp along the top surface of the housing towards the feed slot to hold a buckle of the band, and rotating the pair of gears within the housing with an electric motor to pull a tail end of the band through the feed slot as the pair of gears rotate, at 206. In addition, the method includes calculating a torque using a motor current of the electric motor to determine when to stop rotating the pair of gears, at 208, and pushing a roller pin along a roller slot to form a fold in the band, at 210. The method also includes cutting the band above the fold with a cutting blade, at 212, and folding over a cut end of the band with a raised portion of the cutter blade, at 214.

In a particular embodiment, the method includes transmitting a signal to engage an actuator to initiate movement of the roller pin and the cutting blade to cut the band when That which is claimed is:

1. A powered banding device comprising:
a housing having a feed slot along a top surface;
a plurality of gears within the housing and configured to pull a tail end of a band through the feed slot as the plurality of gears rotate;
an electric motor coupled to and configured to cause rotation of the plurality of gears to pull the band between the pair of gears;
torque circuitry coupled to the electric motor and configured to calculate a torque using a motor current of the electric motor to determine when to stop rotating the plurality of gears;
a buckle clamp configured to hold a buckle of the band when pulling the tail end of the band through the housing;
a roller slot formed in the housing between the feed slot and the pair of gears, the roller slot defining an elongated aperture having a first horizontal portion and a second downward curved portion;
a roller pin within the roller slot; and
a cutter blade positioned behind the roller pin within the roller slot;
wherein the roller pin is configured to move through the roller slot when the electric motor stops pulling to form a fold in the band as the roller pin moves to an end of the second downward curved portion, and the cutter blade follows the roller pin and cuts the band above the roller pin as the cutter blade extends across the second downward curved portion of the roller slot.

2. The powered banding tool of claim 1, wherein the cutter blade comprises a raised portion that is configured to flatten a cut end of the band back over the buckle.

3. The powered banding device of claim 1, further comprising an actuator coupled to and configured to drive the buckle clamp, roller pin and cutter blade back and forth.

4. The powered banding device of claim 1, wherein the plurality of gears drive gripping rollers.

5. The powered banding device of claim 1, wherein the buckle clamp and the cutting blade cooperate to hold the buckle.

6. The powered banding device of claim 1, further comprising a controller coupled to the actuator and the electric motor, and configured to transmit a signal to engage the actuator when the electric motor has stopped.

7. The powered banding device of claim 6, wherein the actuator comprises a reciprocating piston.

8. The powered banding device of claim 1, wherein the buckle clamp comprises a plurality of fingers configured to slidingly engage the buckle of the band.

9. The powered banding device of claim 1, further comprising a stationary blade fixed across from the first horizontal portion of the roller slot and configured to cooperate with the cutting blade to cut the band using a shearing action as the cutting blade extends across the second downward curved portion of the roller slot.

10. A powered banding device comprising:
a housing having a feed slot along a top surface;
a plurality of gripping rollers configured to pull a tail end of a band through the feed slot as the plurality of gripping rollers rotate;
a roller slot formed in the housing between the feed slot and the plurality of gripping rollers, the roller slot defining an elongated aperture having a first horizontal portion and a second downward curved portion;
an electric motor coupled to and configured to cause rotation of the plurality of gripping rollers to pull the band between the plurality of gripping rollers; and
a buckle clamp configured to hold a buckle of the band when pulling the tail end of the band through the housing.

11. The powered banding device of claim 10, further comprising:
a roller pin within the roller slot; and
a cutter blade positioned behind the roller pin within the roller slot.

12. The powered banding device of claim 11, further comprising an actuator coupled to and configured to drive the buckle clamp, roller pin and cutter blade back and forth.

13. The powered banding device of claim 12, further comprising a controller coupled to the actuator and the electric motor, and configured to transmit a signal to engage the actuator when the electric motor has stopped.

14. The powered banding device of claim 11, wherein the plurality of gripping rollers comprise diamond knurled gripping rollers.

15. The powered banding device of claim 10, further comprising torque circuitry coupled to the electric motor and configured to calculate a torque using a motor current of the electric motor to determine when to stop rotating the plurality of gripping rollers.

16. The powered banding device of claim 10, wherein the buckle clamp comprises a plurality of fingers configured to slidingly engage the buckle of the band.

17. A method for securing a band around an object, the method comprising:
feeding a band through a feed slot along a top surface of a housing;
using a buckle clamp along the top surface of the housing to hold a buckle of the band;
rotating a plurality of gripping rollers within the housing with an electric motor to pull a tail end of the band through the feed slot;
moving a roller pin along a first horizontal portion and a second downward curved portion of a roller slot to form a fold in the band for cutting, wherein the roller slot having an elongated aperture; and
cutting the band above the fold with a cutting blade.

18. The method of claim 17, further comprising folding over a cut end of the band with a raised portion of the cutting blade.

19. The method of claim 18, further comprising calculating a torque using a motor current of the electric motor to determine when to stop rotating the plurality of gears.

* * * * *